(12) United States Patent
Miyata

(10) Patent No.: US 10,887,489 B2
(45) Date of Patent: Jan. 5, 2021

(54) IMAGE FORMING APPARATUS AND SERVER FOR USING THE IMAGE FORMING APPARATUS AS ACCESS POINT

(71) Applicant: FUJI XEROX CO., LTD., Tokyo (JP)

(72) Inventor: Shigeo Miyata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/547,591

(22) Filed: Aug. 22, 2019

(65) Prior Publication Data
US 2020/0288041 A1 Sep. 10, 2020

(30) Foreign Application Priority Data
Mar. 6, 2019 (JP) .................. 2019-040788

(51) Int. Cl.
*H04N 1/00* (2006.01)
*H04N 1/44* (2006.01)
*H04N 1/327* (2006.01)

(52) U.S. Cl.
CPC ....... *H04N 1/4433* (2013.01); *H04N 1/00244* (2013.01); *H04N 1/32771* (2013.01); *H04N 1/4426* (2013.01)

(58) Field of Classification Search
CPC .................................................. H04N 1/4433
See application file for complete search history.

(56) References Cited

U.S. PATENT DOCUMENTS

| 10,203,918 B2 | 2/2019 | Kawasaki |
| 10,277,599 B2 | 4/2019 | Sakabe |
| 2014/0355063 A1* | 12/2014 | Jang ................ G06F 3/1236 358/1.15 |
| 2015/0099502 A1* | 4/2015 | Park ................. H04W 4/80 455/418 |
| 2016/0255245 A1* | 9/2016 | Ishibashi ........... H04N 1/00244 358/1.14 |
| 2019/0129664 A1* | 5/2019 | Kawasaki ............ G06F 21/31 |
| 2019/0253401 A1* | 8/2019 | Asakura ............. G06F 3/1236 |
| 2019/0332335 A1* | 10/2019 | Watanabe ........... G06F 3/1235 |
| 2020/0089446 A1* | 3/2020 | Shiotani ............. G06F 3/1238 |

FOREIGN PATENT DOCUMENTS

| JP | 2017049682 | 3/2017 |
| JP | 2017212677 | 11/2017 |
| JP | 2018117168 | 7/2018 |

* cited by examiner

*Primary Examiner* — Benjamin O Dulaney
(74) *Attorney, Agent, or Firm* — JCIPRNET

(57) ABSTRACT

An image forming apparatus includes a notification unit that notifies an information processing apparatus that is brought close to a specific portion of a body of the image forming apparatus about information for identifying the image forming apparatus and an access point name; a requesting unit that requests security information used for wireless connection using the image forming apparatus as an access point from a server apparatus that generates the security information on conditions that the security information has been requested by the image forming apparatus and user authentication concerning the information processing apparatus has succeeded; and a switching unit that switches to a communication mode using the image forming apparatus as an access point in a case where the security information is given by the server apparatus.

10 Claims, 19 Drawing Sheets

FIG. 1
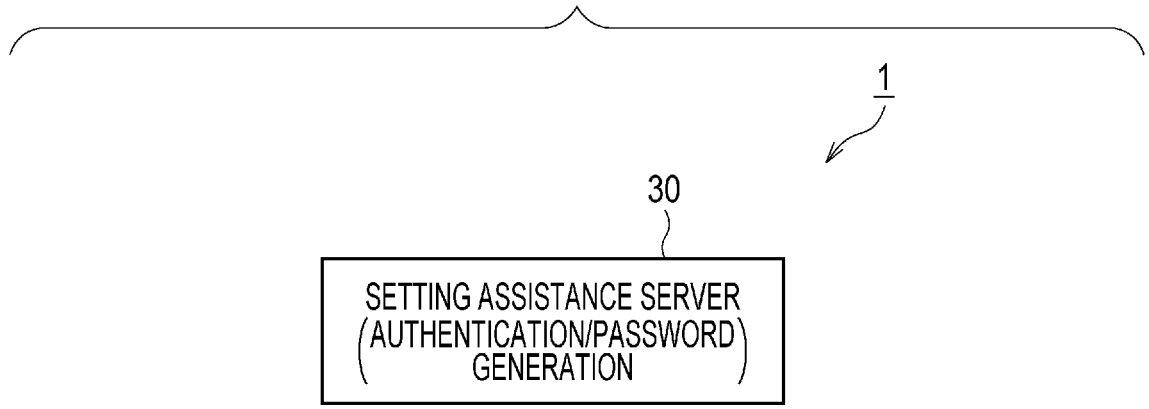
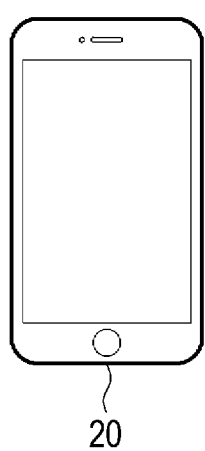
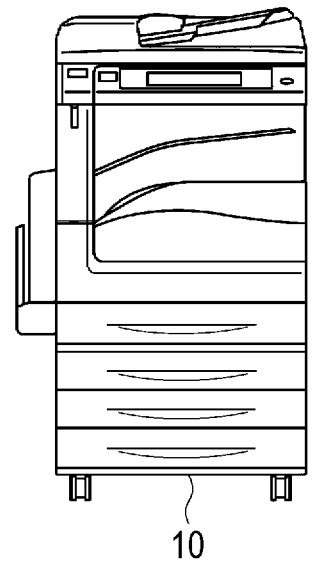

IMAGE FORMING APPARATUS AND SERVER FOR USING THE IMAGE FORMING APPARATUS AS ACCESS POINT

CROSS-REFERENCE TO RELATED APPLICATIONS

This application is based on and claims priority under 35 USC 119 from Japanese Patent Application No. 2019-040788 filed Mar. 6, 2019.

BACKGROUND

(i) Technical Field

The present disclosure relates to an image forming apparatus, a server apparatus, and a non-transitory computer readable medium.

(ii) Related Art

Near field communication (NFC) is one kind of close-range wireless communication technology. There are plural standards as a standard of NFC. Examples of the standard include ISO/IEC 14443. Devices compliant with this standard can communicate with each other within a range of approximately 10 cm. A maximum transmission speed of this standard is 424 kbps, which is lower than other wireless communication methods. For this reason, a wireless communication method of a higher transmission speed is used for transmission of a large volume of data. Japanese Unexamined Patent Application Publication No. 2017-212677 is an example of related art.

SUMMARY

A recent image forming apparatus has a handover function of using NFC for pairing between apparatuses and switching to Wi-Fi DIRECT (Registered Trademark) using the image forming apparatus as an access point to transmit and receive a large volume of data. Specifically, the image forming apparatus that has detected approach of an apparatus compliant with NFC notifies this apparatus about an access point name and a password for authentication that are necessary for activation of Wi-Fi DIRECT through NFC and receives a print job through Wi-Fi DIRECT. However, according to this mechanism, a user with malicious intent can also freely access the image forming apparatus.

Aspects of non-limiting embodiments of the present disclosure relate to protecting an image forming apparatus from a user with malicious intent as compared with a case where all information processing apparatuses brought close to a specific portion of the image forming apparatus are permitted to use wireless connection using the image forming apparatus as an access point.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a notification unit that notifies an information processing apparatus that is brought close to a specific portion of a body of the image forming apparatus about information for identifying the image forming apparatus and an access point name; a requesting unit that requests security information used for wireless connection using the image forming apparatus as an access point from a server apparatus that generates the security information on conditions that the security information has been requested by the image forming apparatus and user authentication concerning the information processing apparatus has succeeded; and a switching unit that switches to a communication mode using the image forming apparatus as an access point in a case where the security information is given by the server apparatus.

BRIEF DESCRIPTION OF THE DRAWINGS

Exemplary embodiments of the present disclosure will be described in detail based on the following figures, wherein:

FIG. 1 is a view for explaining a conceptual configuration of an information processing system used in a first exemplary embodiment;

DETAILED DESCRIPTION

Figure 2:
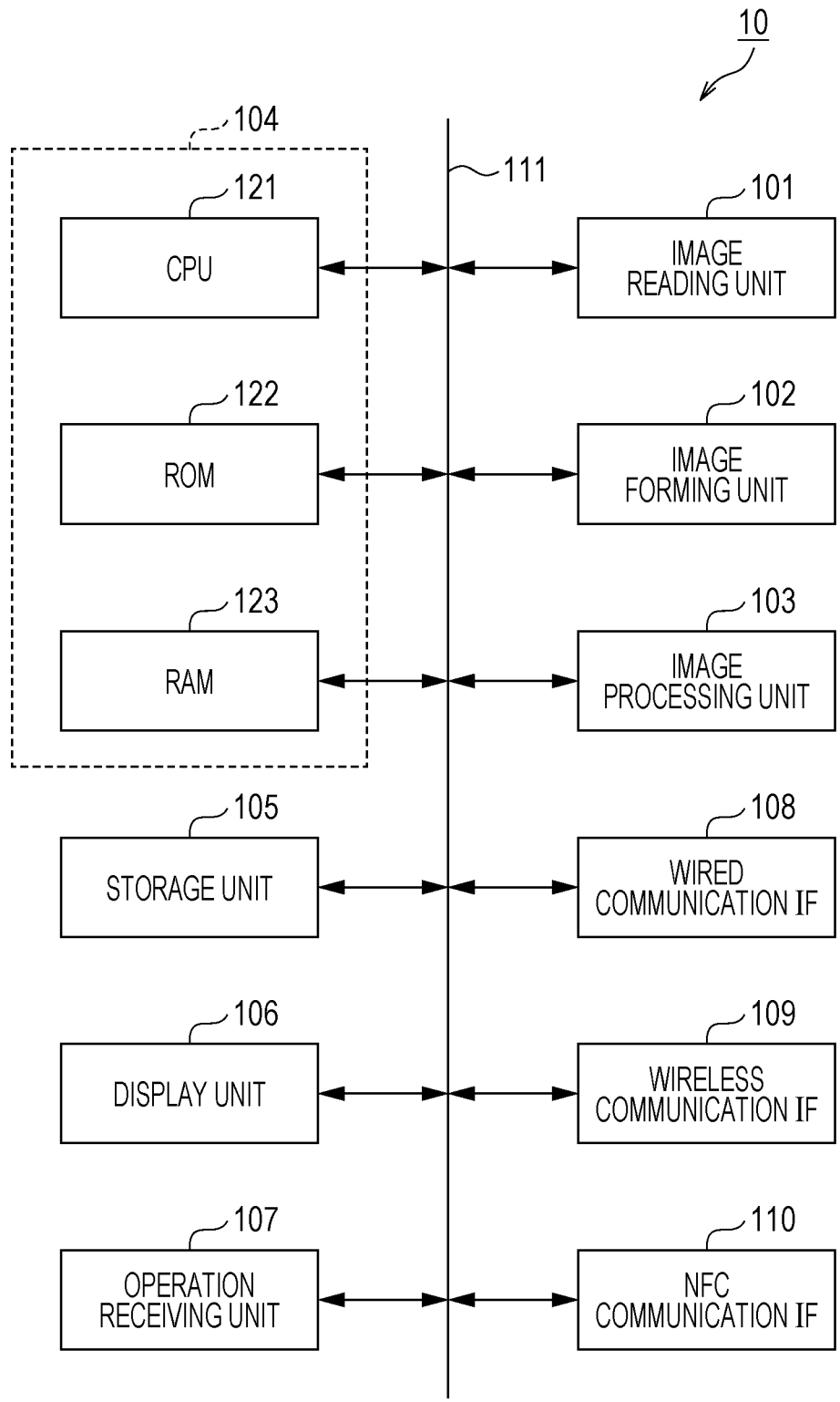
FIG. 2 is a view for explaining an example of a configuration of an image forming apparatus used in the first exemplary embodiment.

Exemplary embodiments of the present disclosure are described below with reference to the drawings.

First Exemplary Embodiment

Overall Configuration of System

FIG. 1 is a view for explaining a conceptual configuration of an information processing system 1 used in the first exemplary embodiment. The information processing system 1 includes an image forming apparatus 10 that has a Wi-Fi DIRECT communication function and an NFC communication function, a mobile terminal apparatus 20 that has a Wi-F (Registered Trademark) communication function and an NFC communication function, and a setting assistance server 30 that assists connection settings of Wi-Fi DIRECT communication starting from NFC communication.

Although a single terminal apparatus 20 is illustrated in FIG. 1, the information processing system 1 may include plural terminal apparatuses 20. The setting assistance server 30 is an example of a server apparatus.

The image forming apparatus 10 according to the present exemplary embodiment has a Wi-Fi DIRECT communication function and an NFC communication function in addition to basic functions used to form an image on a recording medium such as a sheet of paper.

Having a Wi-Fi DIRECT communication function means that direct communication with another apparatus having a Wi-Fi communication function is possible without a base unit such as a Wi-Fi router. In other words, having a Wi-Fi DIRECT communication function means having a communication function of causing the apparatus having the Wi-Fi DIRECT communication function to operate as an access point. The other apparatus with which the apparatus having the Wi-Fi DIRECT communication function communicates need just have a Wi-Fi communication function. That is, the other apparatus with which the apparatus having the Wi-Fi DIRECT communication function communicates need not have a Wi-Fi DIRECT communication function.

The image forming apparatus 10 and the terminal apparatus 20 that are communicating with each other by using the Wi-Fi DIRECT communication function cannot perform communication through a base unit such as a Wi-Fi router. That is, the image forming apparatus 10 that is performing communication using the Wi-Fi DIRECT communication function is capable of communicating with only the terminal apparatus 20 that is a communication partner.

Having an NFC communication function means complying with a communication standard that enables communication on a condition that a distance between antennas (coils) is 10 cm or less. The communication standard whose communication distance is approximately 10 cm is, for example, ISO/IEC14443.

A mark (not illustrated) that serves as a guide when the terminal apparatus 20 is brought close to the image forming apparatus 10 is printed on a specific portion in which an antenna for NFC communication is disposed in a body of the image forming apparatus 10. In the present exemplary embodiment, bringing the terminal apparatus 20 close to this mark is referred to as placing or tapping the terminal apparatus 20 over or on the image forming apparatus 10.

In the present exemplary embodiment, the NFC communication function is used to notify the terminal apparatus 20 about a service set identifier (SSID) representing an identification name (e.g., an access point name) of the image forming apparatus 10 that serves as an access point and a machine ID for physically identifying the image forming apparatus 10.

In the present exemplary embodiment, a password necessary for connection settings of the Wi-Fi DIRECT communication function is not transmitted from the image forming apparatus 10 to the terminal apparatus 20 through communication using the NFC communication function. The password is an example of security information. The machine ID is an example of information for identifying an image forming apparatus from which a password for Wi-Fi DIRECT communication is requested.

The terminal apparatus 20 according to the present exemplary embodiment is a terminal that transmits a print job to the image forming apparatus 10. The terminal apparatus 20 is a mobile terminal such as a smartphone, a notebook computer, a wristwatch-type wearable terminal, or an eyeglasses-type wearable terminal having the Wi-Fi function and the NFC function. The terminal apparatus 20 is an example of an information processing apparatus to which the image forming apparatus 10 is to be connected.

The setting assistance server 30 according to the present exemplary embodiment is a server apparatus that generates a password necessary for wireless connection with the image forming apparatus 10 operating as an access point in a case where a predetermined condition is met.

In the present exemplary embodiment, the predetermined condition is met in a case where user authentication of the terminal apparatus 20 has succeeded, a request for a password has been made from the image forming apparatus 10, and a request for a password has been made from the terminal apparatus 20.

It is assumed that the setting assistance server 30 according to the present exemplary embodiment can communicate with both of the image forming apparatus 10 and the terminal apparatus 20 through a Wi-Fi router or the like during a period other than Wi-Fi DIRECT communication.

Configurations of Apparatuses

Configuration of Image Forming Apparatus

FIG. 2 is a view for explaining an example of a configuration of the image forming apparatus 10 used in the first exemplary embodiment.

The image forming apparatus 10 includes an image reading unit 101 that reads an image of a document, an image forming unit 102 that forms an image on a sheet of paper that is an example of a recording medium, an image processing unit 103 that performs processing such as color correction and tone correction on an image represented by image data, a control unit 104 that controls operation of the whole apparatus, a storage unit 105 in which image data and the like are stored, a display unit 106 used to display a user interface screen and the like, an operation receiving unit 107 that receives a user's operation, a wired communication interface (wired communication IF) 108 that realizes communication using a telephone line or a local area network (LAN) cable, a wireless communication interface (wireless communication IF) 109 that realizes wireless network communication such as Wi-Fi, and an NFC communication interface (NFC communication IF) 110 that realizes NFC communication.

The image reading unit 101 is a scanner and may have a mechanism for automatically feeding a document.

The image forming unit 102 is a unit that forms an image on a recording medium according to a system such as an electrophotographic system or an inkjet system and has a mechanism according to a formation method.

The image processing unit 103 is, for example, a dedicated processor or processing circuit for processing image data.

The control unit 104 has a central processing unit (CPU) 121, a read only memory (ROM) 122 in which firmware, basic input output system (BIOS), and the like are stored, and a random access memory (RAM) 123 used as a work area. The control unit 104 functions as a computer.

The storage unit 105 is, for example, a hard disk device (HDD) that is a non-volatile storage device. In the storage unit 105, image data read by the image reading unit 101, image data given from an outside through communication, image data received through FAX communication, and the like are stored.

The display unit 106 is, for example, a liquid crystal display or an organic electro luminescence (EL) display.

The operation receiving unit 107 is, for example, a touch sensor, a switch, or a button disposed on a surface of the display unit 106.

The control unit 104 and the units and the like are connected through a bus 111 and a signal line (not illustrated).

Figure 3:
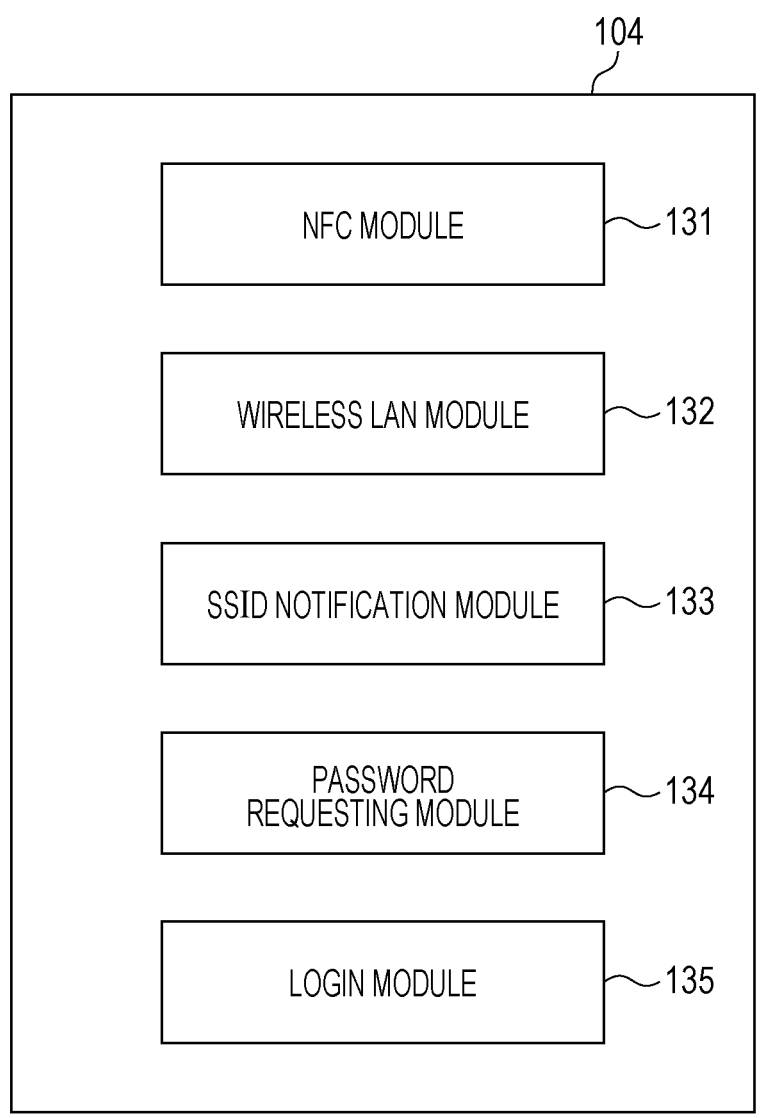
FIG. 3 is a view for explaining a functional configuration of a control unit used in the first exemplary embodiment.

FIG. 3 is a view for explaining a functional configuration of the control unit 104 used in the first exemplary embodiment. The functional module illustrated in FIG. 3 is realized through execution of a program by the CPU 121 (see FIG. 2). The functional module illustrated in FIG. 3 is an example of a functional module provided by the control unit 104.

The control unit 104 according to the present exemplary embodiment has functions as an NFC module 131 that realizes NFC communication, a wireless LAN module 132 that realizes wireless network communication, an SSID notification module 133 that notified the terminal apparatus 20 connected through NFC about an access point name (SSID) of the image forming apparatus 10, a password requesting module 134 that requests a password from the setting assistance server 30 connected over a wireless LAN, and a login module 135 that executes processing for logging into the image forming apparatus 10 serving as an access point.

The SSID notification module 133 is an example of a notification unit. The password requesting module 134 transmits a request for a password including a machine ID of the image forming apparatus 10 to the setting assistance server 30. The password requesting module 134 is an example of a requesting unit. The password requesting module 134 also has a function of switching to a communication mode in which the image forming apparatus 10 serves as an access point upon notification of a password from the setting assistance server 30. In this respect, the password requesting module 134 is also an example of a switching unit.

The login module 135 permits login in a case where a login password received from the terminal apparatus 20 matches a password transmitted from the setting assistance server 30. The login module 135 in this case is an example of a permitting unit.

Note that a communication path to the setting assistance server 30 need not entirely be a wireless LAN. For example, a communication path to a certain access point may be a wireless path and a communication path from the access point may be a wired path.

Description of functional modules necessary for image formation and the like is omitted.

Figure 4:
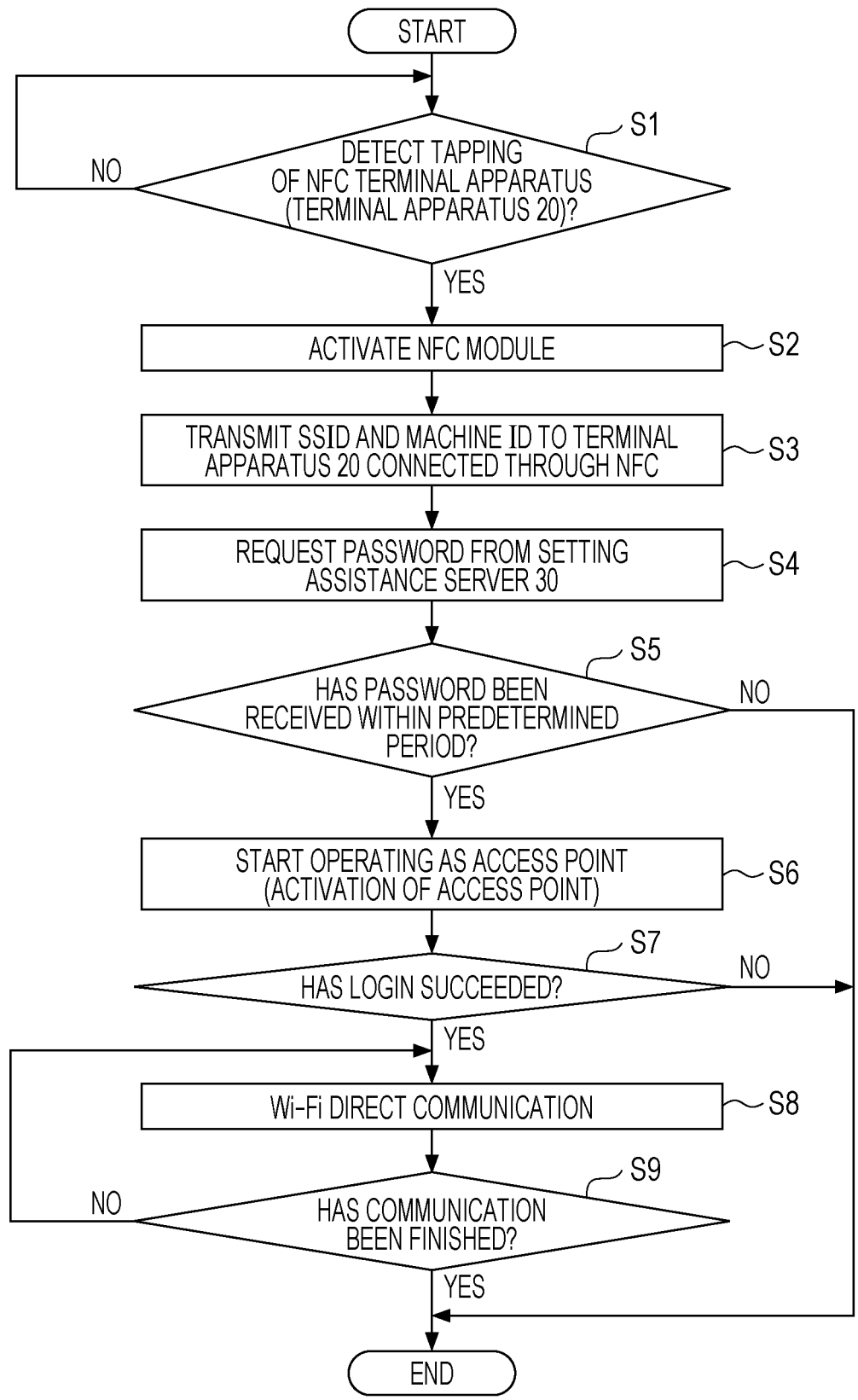
FIG. 4 is a flowchart for explaining a processing operation executed by the image forming apparatus used in the first exemplary embodiment.

FIG. 4 is a flowchart for explaining processing operation executed by the image forming apparatus 10 used in the first exemplary embodiment. The processing operation illustrated in FIG. 4 is realized by cooperation of the above modules. Note that the sign "S" in FIG. 4 represents a step.

First, the image forming apparatus 10 determines whether or not tapping of the terminal apparatus 20 has been detected (step 1). As described above, tapping is a state where the terminal apparatus 20 is within a range of less than 10 cm, which is an NFC communication distance. A technique for detecting tapping is known and is therefore omitted. The image forming apparatus 10 repeats the determining process in step 1 while a negative result is obtained in step 1.

In a case where a positive result is obtained in step 1, the image forming apparatus 10 activates the NFC module 131 (see FIG. 3) (step 2).

Next, the image forming apparatus 10 transmits an SSID and a machine ID to the terminal apparatus 20 connected to the image forming apparatus 10 through NFC (step 3).

Then, the image forming apparatus 10 requests a password from the setting assistance server 30 (step 4). The password is information necessary for connection settings (i.e., login) of the Wi-Fi DIRECT communication function. A network position of the setting assistance server 30 that receives the request is set in advance. The network may be a local network or may be the Internet (including a cloud network). In the present exemplary embodiment, the request is executed through a wireless network.

Then, the image forming apparatus 10 determines whether or not a password has been received within a predetermined period (step 5). In a case where a negative result is obtained in step 5, the image forming apparatus 10 finishes the processing without activating an access point. The event in which a negative result is obtained in step 5 occurs in a case where user authentication of the terminal apparatus 20 is unsuccessful.

In a case where a positive result is obtained in step 5, the image forming apparatus 10 starts operating as an access point (step 6). Hereinafter, a state where the image forming apparatus 10 has started operating as an access point is referred to as "activation of an access point".

Next, the image forming apparatus 10 determines whether or not login to the access point has succeeded (step 7).

In a case where a negative result is obtained in step 7, the image forming apparatus 10 finishes the processing without starting Wi-Fi DIRECT communication. The event in which a negative result is obtained in step 7 occurs in a case where a password given from the terminal apparatus 20 is different from the password received in response to the request in step 4. In this case, the image forming apparatus 10 regards the access to the image forming apparatus 10 has been made by a user having malicious intent.

In a case where a positive result is obtained in step 7, the image forming apparatus 10 starts Wi-Fi DIRECT communication (step 8). When Wi-Fi DIRECT communication starts, reception of a print job from the terminal apparatus 20 that is a communication partner becomes possible. Accordingly, the image forming apparatus 10 executes formation (i.e., printing) of an image based on the received print job.

The image forming apparatus 10 determines whether or not communication has been finished (step 9) and maintains Wi-Fi DIRECT communication until a positive result is obtained.

When a positive result is obtained in step 9, the image forming apparatus 10 finishes Wi-Fi DIRECT communication.

Configuration of Terminal Apparatus

Figure 5:
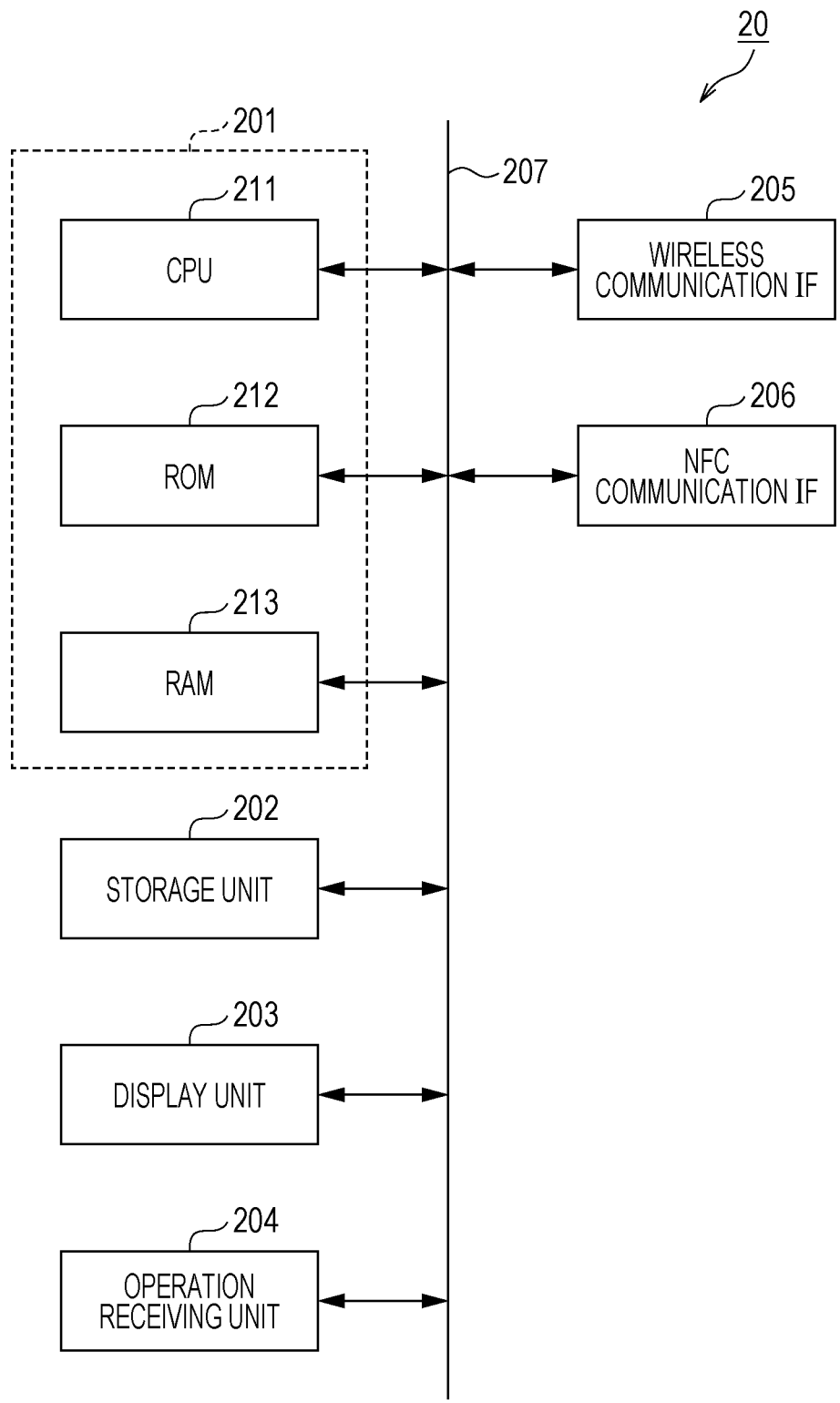
FIG. 5 is a view for explaining an example of a configuration of a terminal apparatus used in the first exemplary embodiment.

FIG. 5 is a view for explaining an example of a configuration of the terminal apparatus 20 used in the first exemplary embodiment.

The terminal apparatus 20 includes a control unit 201 that controls operation of the whole apparatus, a storage unit 202 in which image data and the like are stored, a display unit 203 used to display a user interface and the like, an operation receiving unit 204 that receives a user's operation, a wireless communication interface (wireless communication IF) 205 that realizes wireless network communication such as Wi-Fi, and an NFC communication interface (NFC communication IF) 206 that realizes NFC communication.

The control unit 201 according to the present exemplary embodiment has a CPU 211, a ROM 212 in which firmware, BIOS, and the like are stored, and a RAM 213 used as a work area. The control unit 201 functions as a computer.

The storage unit 202 is, for example, a hard disk device that is a non-volatile storage device, a non-volatile rewritable semiconductor memory, or the like. The storage unit 202 varies depending on a product form of the terminal apparatus 20. In the storage unit 202, image data to be printed and the like are stored.

The display unit 203 is, for example, a liquid crystal display or an organic EL display.

The operation receiving unit 204 is a touch sensor, a switch, a button, or the like disposed on a surface of the display unit 203.

The control unit 201 and the units and the like are connected through a bus 207 and a signal line (not illustrated).

Figure 6:
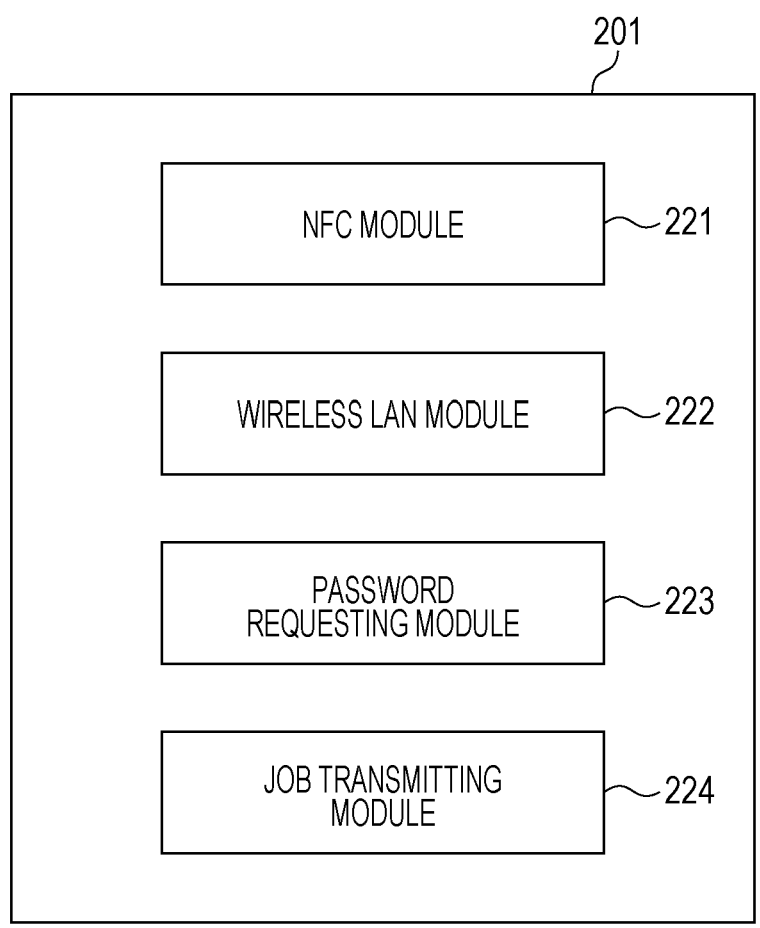
FIG. 6 is a view for explaining a functional configuration of a control unit used in the first exemplary embodiment.

FIG. 6 is a view for explaining a functional configuration of the control unit 201 used in the first exemplary embodiment. The functional module illustrated in FIG. 6 is realized through execution of a program by the CPU 211 (see FIG. 5). The functional module illustrated in FIG. 6 is an example of a functional module provided by the control unit 201.

The control unit 201 according to the present exemplary embodiment has functions as an NFC module 221 that realizes NFC communication, a wireless LAN module 222 that realizes wireless network communication, a password requesting module 223 that requests a password from the setting assistance server 30 (see FIG. 1) connected through a wireless LAN, and a job transmitting module 224 that transmits a print job to the image forming apparatus 10 that is connected through a wireless LAN.

The password requesting module 223 according to the present exemplary embodiment transmits a request for a password together with a user ID associated with an account of a user who operates the terminal apparatus 20 and a machine ID received from the image forming apparatus 10. The user ID is an example of user information.

Note that a communication path to the setting assistance server 30 need not entirely be a wireless LAN. For example, a communication path to a certain access point may be a wireless path and a communication path from the access point may be a wired path.

Figure 7:
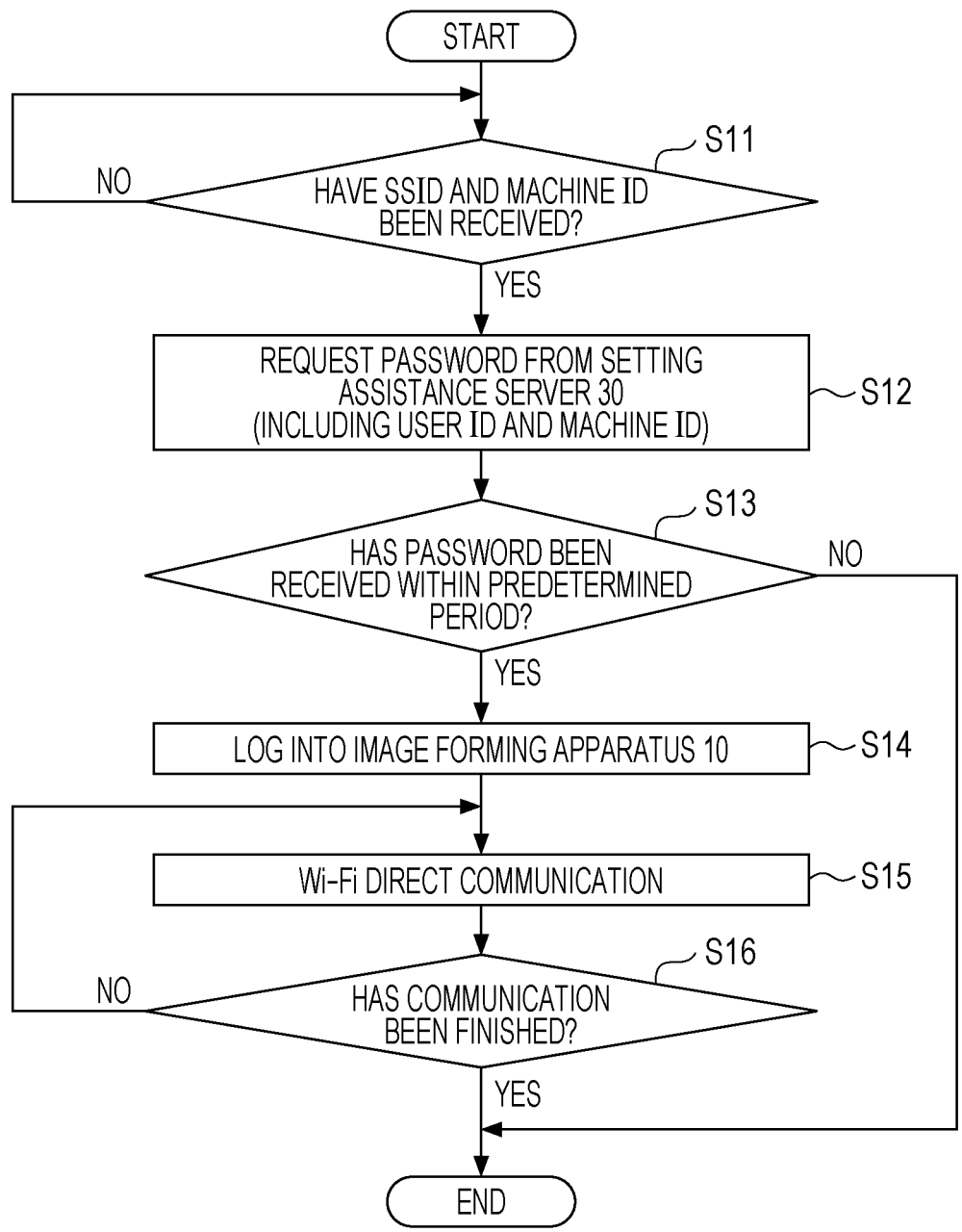
FIG. 7 is a flowchart for explaining processing operation executed by the terminal apparatus used in the first exemplary embodiment.

FIG. 7 is a flowchart illustrating processing operation executed by the terminal apparatus 20 used in the first exemplary embodiment. The processing operation illustrated in FIG. 7 is realized by cooperation of the above modules. The sign "S" in FIG. 7 represents a step.

First, the terminal apparatus 20 determines whether or not an SSID and a machine ID have been received (step 11). In a case where the NFC module 221 (see FIG. 6) of the terminal apparatus 20 and the NFC module 131 (see FIG. 3) of the image forming apparatus 10 are away from each other by the communication distance or longer, a negative result is obtained in step 11. Meanwhile, in a case where the terminal apparatus 20 is brought close to the image forming apparatus 10 so as to be placed over the specific portion of the image forming apparatus 10, a positive result is obtained in step 11.

In a case where a positive result is obtained in step 11, the terminal apparatus 20 requests a password from the setting assistance server 30 (step 12). This password is also a password used for connection settings of the Wi-Fi DIRECT communication function. A network position of the setting assistance server 30 that receives the request is set in advance in the terminal apparatus 20. For example, the network position of the setting assistance server 30 is written in an application program. In the present exemplary embodiment, the request is executed through a wireless network.

In the present exemplary embodiment, the request for a password given to the setting assistance server 30 includes a user ID and the machine ID received from the image forming apparatus 10 on which the terminal apparatus 20 has been tapped. The user ID is used for user authentication in the setting assistance server 30. The machine ID is used to specify where the password is to be used.

Then, the terminal apparatus 20 shifts to a state for determining whether or not a password has been received within a predetermined period (step 13). The predetermined period starts, for example, from a time of receipt of the SSID and the machine ID or a time of transmission of the request for a password to the setting assistance server 30.

In a case where a negative result is obtained in step 13, the terminal apparatus 20 finishes the processing without logging into the image forming apparatus 10 serving as an access point. In the present exemplary embodiment, the event in which a negative result is obtained in step 13 occurs in a case where user authentication of the terminal apparatus 20 is unsuccessful or in a case where a password request from the image forming apparatus 10 does not reach the setting assistance server 30.

Meanwhile, in a case where a positive result is obtained in step 13, the terminal apparatus 20 logs into the image forming apparatus 10 serving as an access point (step 14). The SSID received in step 11 and the password received in response to the request in step 12 are used for the login.

After the login, the terminal apparatus 20 starts Wi-Fi DIRECT communication (step 15). When Wi-Fi DIRECT communication starts, transmission of a print job to the image forming apparatus 10 that is a communication partner becomes possible.

The terminal apparatus 20 determines whether or not the communication has been finished (step 16) and maintains the Wi-Fi DIRECT communication until a positive result is obtained.

In a case where a positive result is obtained in step 16, the terminal apparatus 20 finishes the Wi-Fi DIRECT communication.

Configuration of Setting Assistance Server

Figure 8:
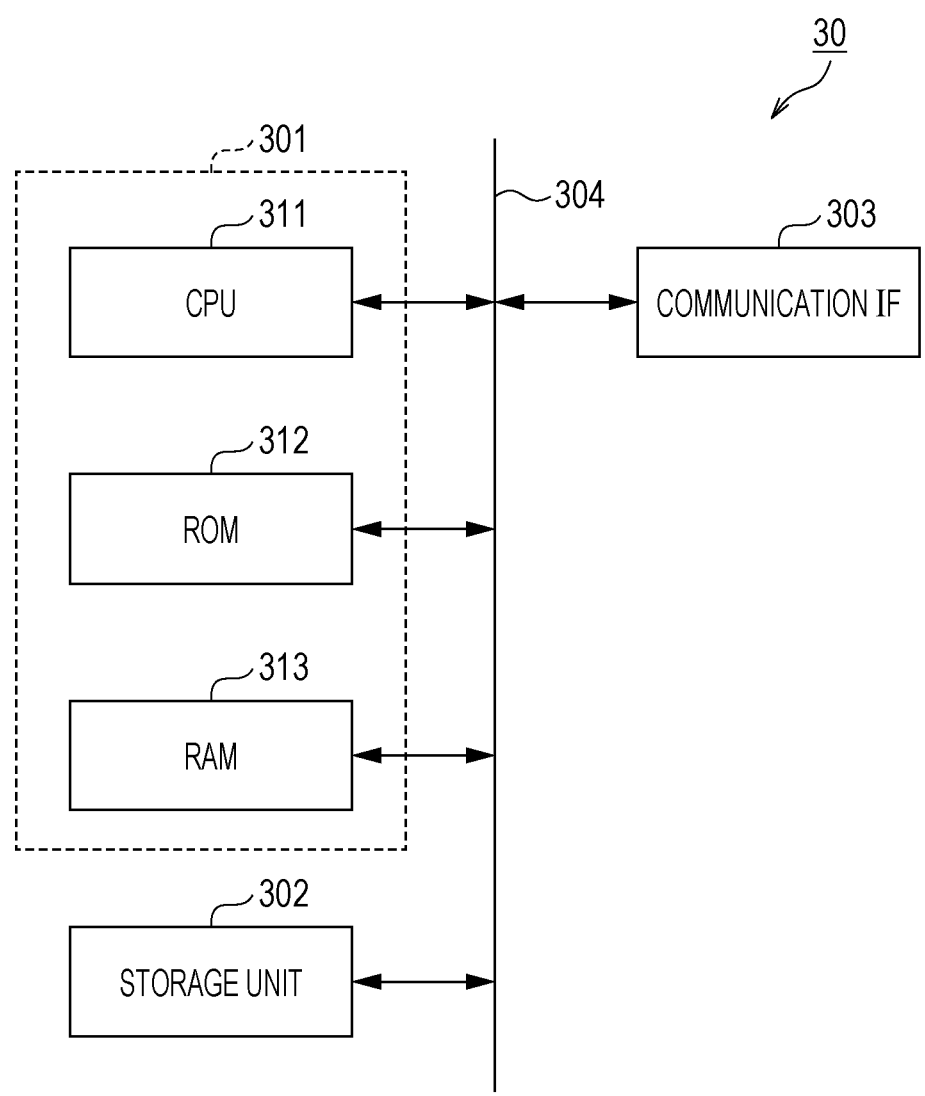
FIG. 8 is a view for explaining an example of a configuration of a setting assistance server used in the first exemplary embodiment.

FIG. 8 is a view for explaining an example of a configuration of the setting assistance server 30 used in the first exemplary embodiment.

The setting assistance server 30 includes a control unit 301 that controls operation of the whole apparatus, a storage unit 302 in which image data and the like are stored, and a communication interface (communication IF) 303 that realizes communication over a network.

The control unit 301 according to the present exemplary embodiment has a CPU 311, a ROM 312 in which firmware, BIOS, and the like are stored, and a RAM 313 used as a work area. The control unit 301 functions as a computer.

The storage unit 302 is, for example, a hard disk device that is a non-volatile storage device. In the storage unit 302, a table for user authentication and the like are stored.

The communication interface 303 is constituted by both of or one of an interface for wireless network communication such as Wi-Fi and an interface for wired network communication such as a local area network or the Internet.

The control unit 301 and the units and the like are connected through a bus 304 and a signal line (not illustrated).

Figure 9:
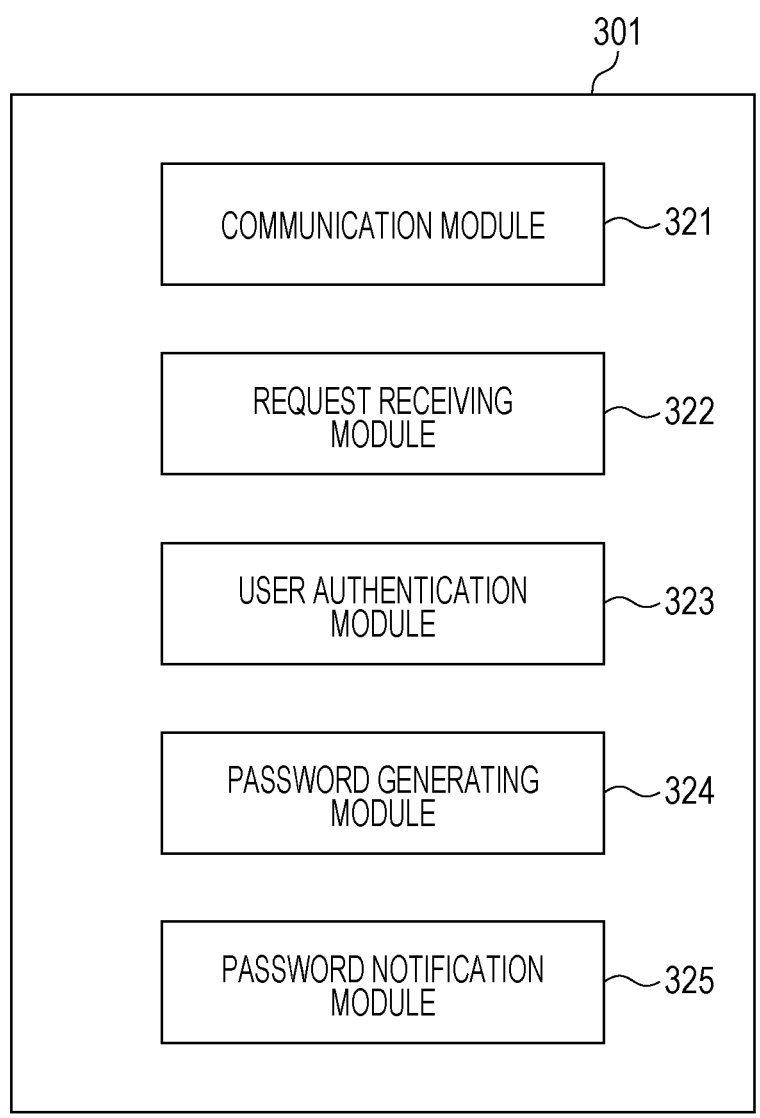
FIG. 9 is a view for explaining a functional configuration of the control unit used in the first exemplary embodiment.

FIG. 9 is a view for explaining a functional configuration of the control unit 301 used in the first exemplary embodiment. The functional module illustrated in FIG. 9 is realized through execution of a program by the CPU 311 (see FIG. 8). The functional module illustrated in FIG. 9 is an example of a functional module provided by the control unit 301.

The control unit 301 according to the present exemplary embodiment has functions as a communication module 321 used for communication with the image forming apparatus 10 and the terminal apparatus 20, a request receiving module 322 that receives a request for a password from the image forming apparatus 10 and the terminal apparatus 20, a user authentication module 323 that executes user authentication, a password generating module 324 that generates a password in a case where a predetermined condition is met, and a password notification module 325 that notifies both of the image forming apparatus 10 and the terminal apparatus 20 about the generated password.

The communication module 321 in this case controls communication according to a communication method that depends on a place of installation and a use environment.

The request for a password received by the request receiving module 322 according to the present exemplary embodiment includes information that varies depending on a sender of the request. In a case where the sender of the request is the image forming apparatus 10, the request for a password includes a machine ID for identifying the image forming apparatus 10. In a case where the sender of the request is the terminal apparatus 20, the request for a password includes the machine ID for identifying the image forming apparatus 10 and a user ID for identifying a user who operates the terminal apparatus 20.

The user authentication module 323 executes processing for authenticating the user who operates the terminal apparatus 20. A result of the authentication is sent to the password generating module 324. The user authentication module 323 is an example of an authenticating unit.

The password generating module 324 generates a password in a case where the user authentication has succeeded and the request for a password has been given by the image forming apparatus 10 that matches the machine ID sent from the terminal apparatus 20. The password is randomly generated. In other words, the password is not fixed information. In this way, the setting assistance server 30 generates a new password every time the terminal apparatus 20 is tapped on the image forming apparatus 10 (in other words, every time a request for a password is given). The password generation is executed irrespective of whether or not the same user has requested a password. Needless to say, in a case where user authentication is unsuccessful and/or in a case where a password has not been requested by the image forming apparatus 10, a password is not generated. The password generating module 324 is an example of a generating unit.

The password notification module 325 is an example of a notification unit.

Figure 10:
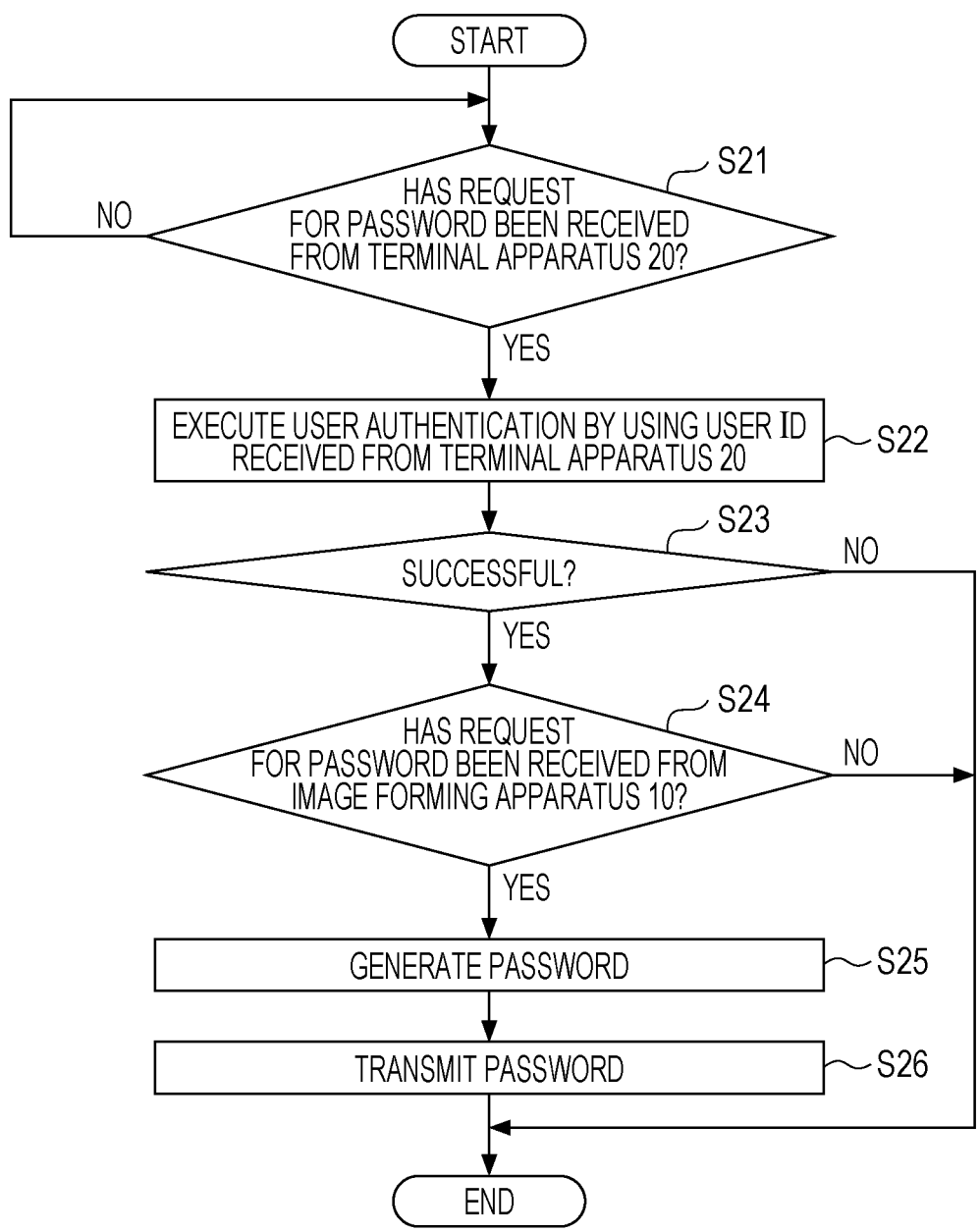
FIG. 10 is a flowchart for explaining processing operation executed by the setting assistance server used in the first exemplary embodiment.

FIG. 10 is a flowchart for explaining processing operation executed by the setting assistance server 30 used in the first exemplary embodiment. The processing operation illustrated in FIG. 10 is realized by cooperation of the above modules. The sign "S" in FIG. 10 represents a step.

First, the setting assistance server 30 determines whether or not a request for a password has been received from the terminal apparatus 20 (step 21). A result of the determining process is negative until the request is received.

In a case where a positive result is obtained in step 21, the setting assistance server 30 executes user authentication by using a user ID received from the terminal apparatus 20 (step 22).

Next, the setting assistance server 30 determines whether or not the user authentication has succeeded (step 23).

In a case where a negative result is obtained in step 23, the setting assistance server 30 finishes the processing without generating a password since there is a possibility that the user is a user with malicious intent. In the present exemplary embodiment, the terminal apparatus 20 is not notified about failure of authentication. Note, however, that the terminal apparatus 20 may be notified about failure of authentication. Furthermore, the image forming apparatus 10 may be notified about failure of authentication.

In a case where a positive result is obtained in step 23, the setting assistance server 30 determines whether or not a request for a password has been received from the image forming apparatus 10 (step 24).

In a case where a negative result is obtained in step 24, the setting assistance server 30 finishes the processing without generating a password since a communication path to the image forming apparatus 10 cannot be created. An error message or the like may be transmitted to the image forming apparatus 10. Furthermore, the terminal apparatus 20 may also be notified about a cause or the like of failure of generation of a password.

In a case where a positive result is obtained in step 24, the setting assistance server 30 generates a password (step 25) and transmits the generated password to the image forming apparatus 10 and the terminal apparatus 20 (step 26).

Example of Processing Sequence

Figure 11:
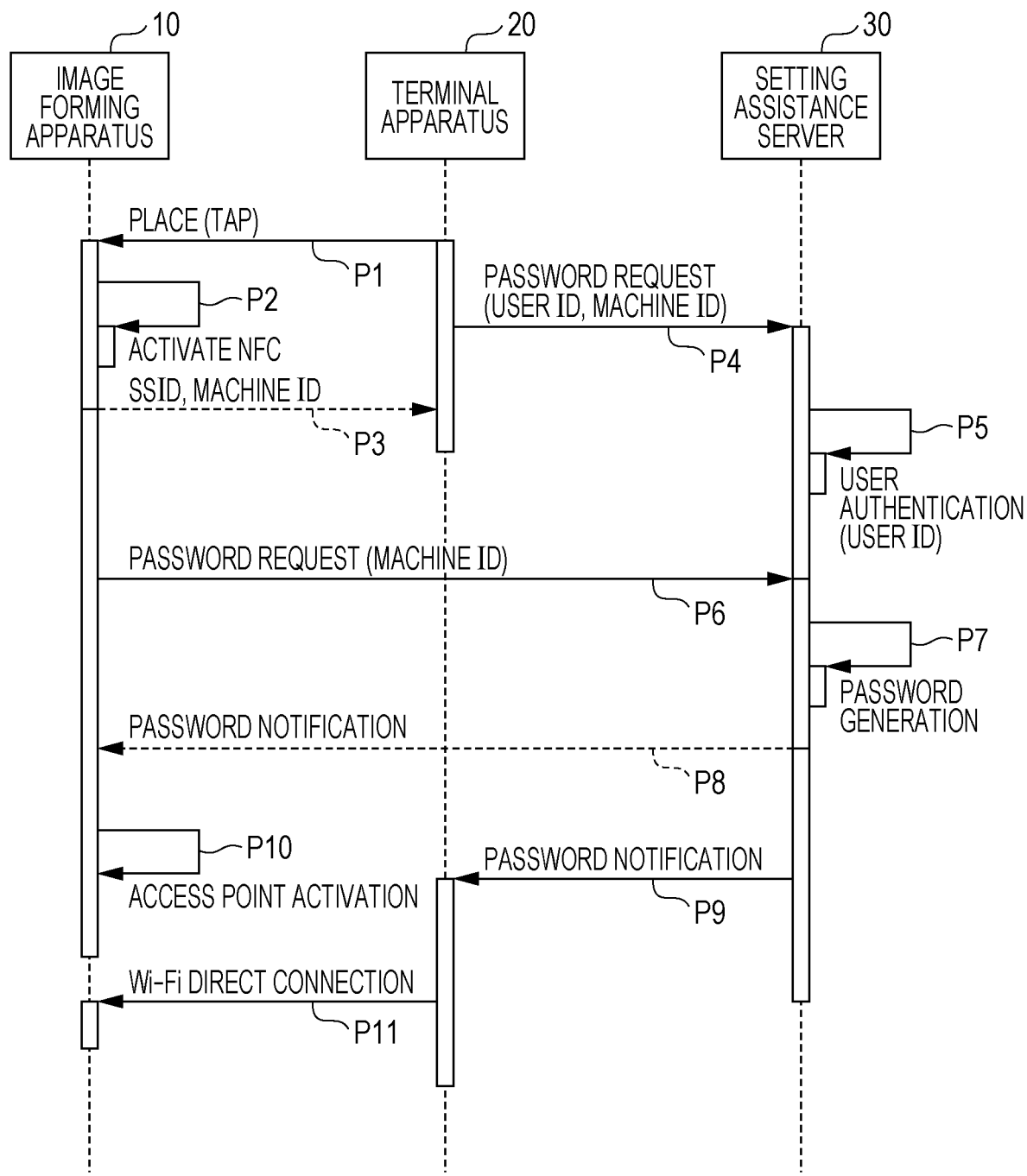
FIG. 11 illustrates an example of a processing sequence executed in the information processing system according to the first exemplary embodiment.

FIG. 11 illustrates an example of a processing sequence executed in the information processing system 1 according to the first exemplary embodiment. The sign "P" in FIG. 11 represents a process.

The processing sequence starts when the terminal apparatus 20 is placed over (or tapped on) the image forming apparatus 10 (process 1).

The image forming apparatus 10 that has detected that the terminal apparatus 20 has been placed over the image forming apparatus 10 activates NFC (process 2).

Next, the image forming apparatus 10 notifies the terminal apparatus 20 about an access point name (SSID) and a machine ID of the image forming apparatus 10 by using NFC (process 3).

Figure 12:
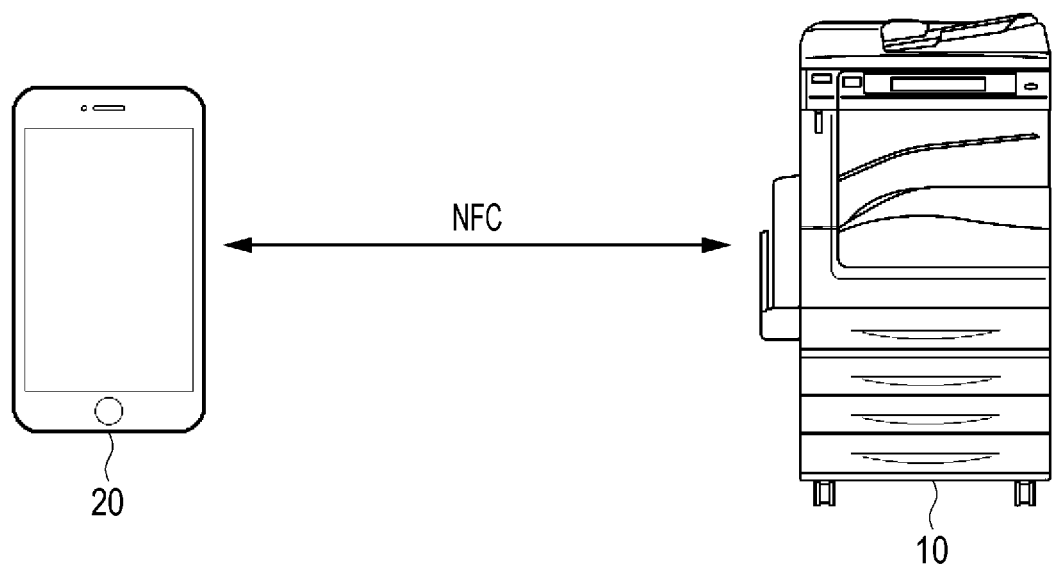
FIG. 12 is a view for explaining a communication state corresponding to processes 1 through 3.

FIG. 12 is a view for explaining a communication state corresponding to processes 1 through 3.

When the terminal apparatus 20 receives the machine ID and the like of the image forming apparatus 10 through NFC communication, the terminal apparatus 20 transmits a request for a password to the setting assistance server 30 (process 4). The request includes the received machine ID and a user ID of the user who operates the terminal apparatus 20.

The setting assistance server 30 executes user authentication by using the received user ID (process 5).

Meanwhile, the image forming apparatus 10 transmits a request for a password to the setting assistance server 30 after notifying the terminal apparatus 20 about the access point name and the machine ID (process 6).

Figure 13:
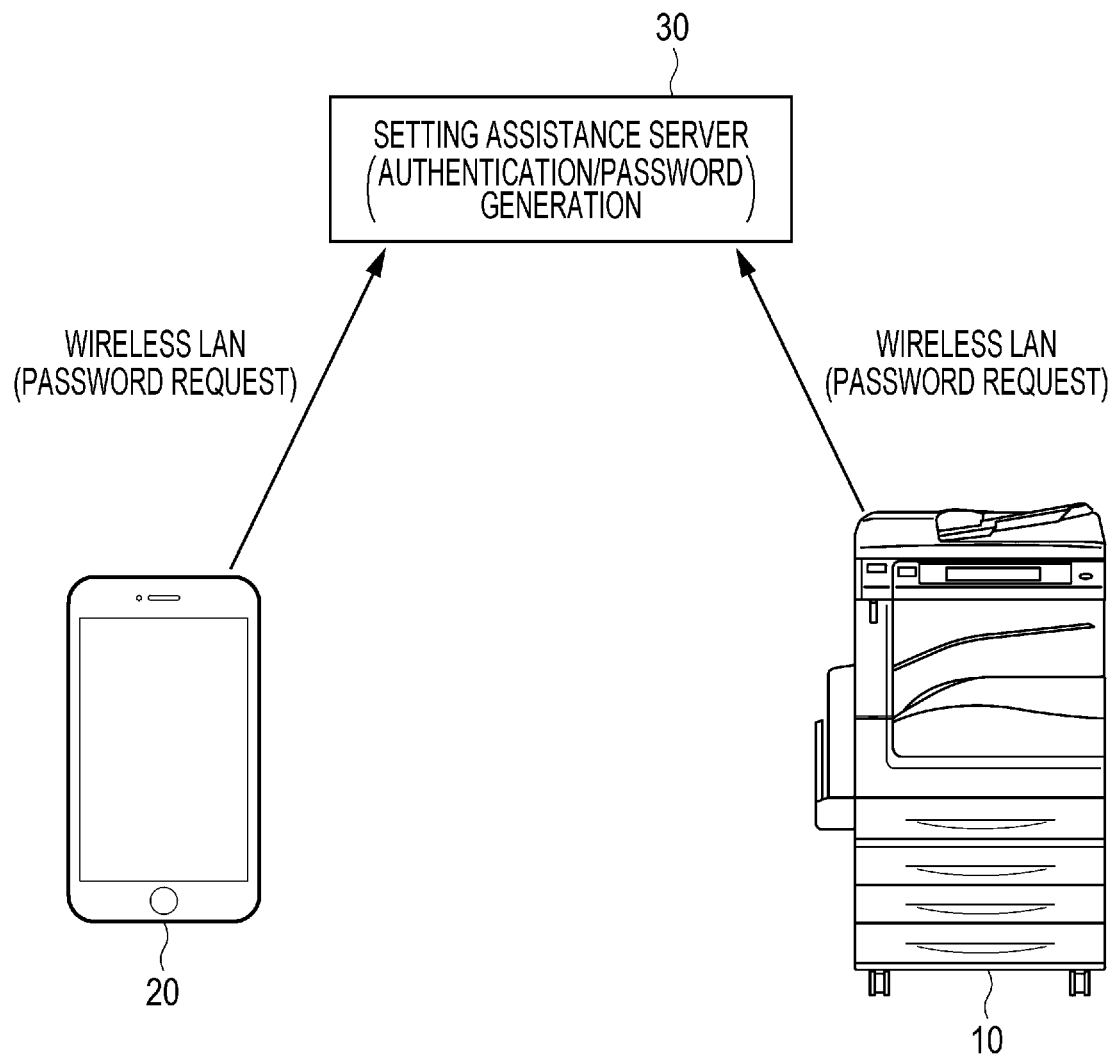
FIG. 13 is a view for explaining a communication state corresponding to processes 4 through 6.

FIG. 13 is a view for explaining a communication state corresponding to processes 4 through 6. The communication in this state is executed over a network. In FIG. 13, a wireless LAN is used.

The setting assistance server 30 that has received the request for a password from the image forming apparatus 10 generates a password on a condition that corresponding user authentication has succeeded (process 7). When the password is generated, the setting assistance server 30 notifies the image forming apparatus 10 and the terminal apparatus 20 about the generated password (processes 8 and 9).

Figure 14:
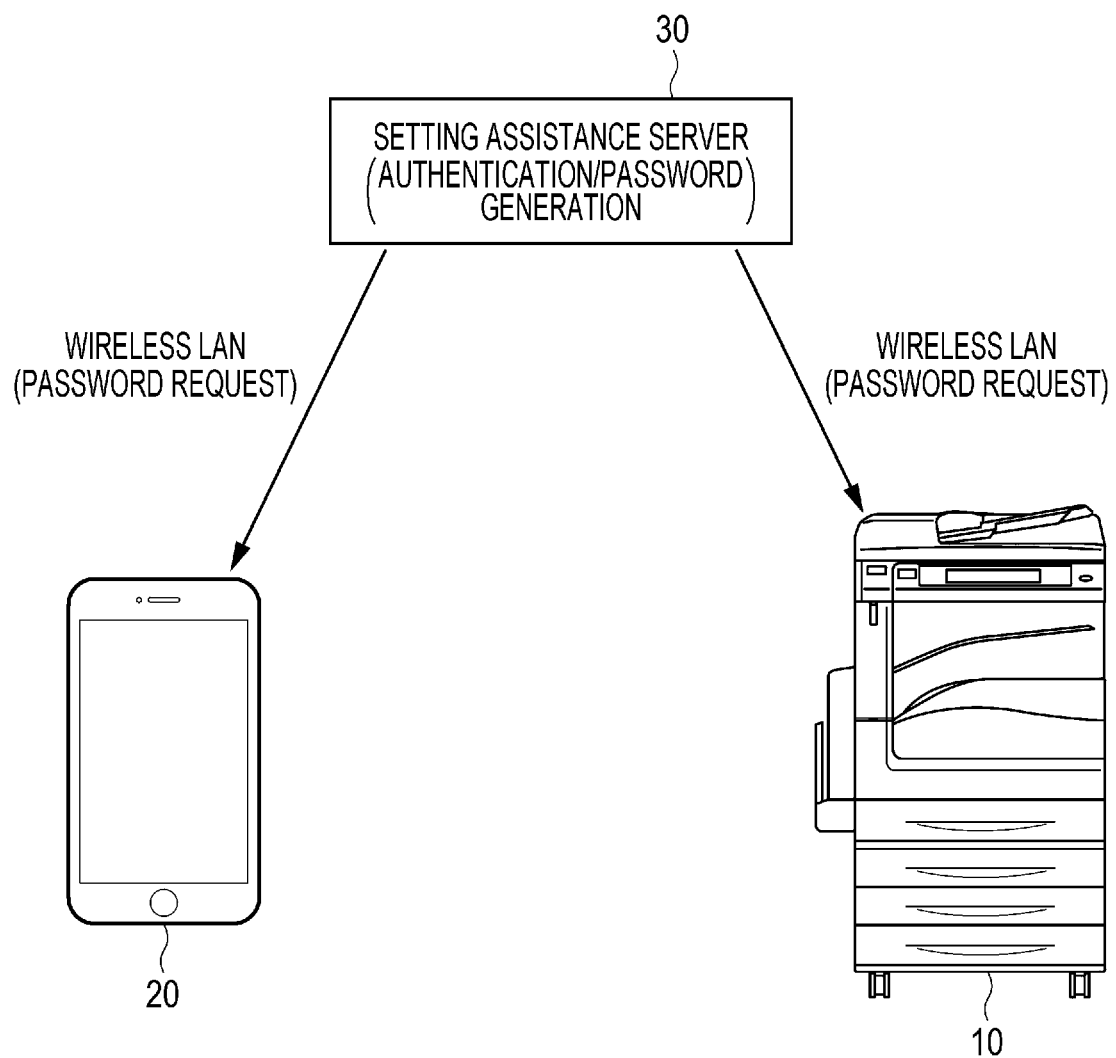
FIG. 14 is a view for explaining a communication state corresponding to processes 7 through 9.

FIG. 14 is a view for explaining a communication state corresponding to processes 7 through 9. The communication in this state is executed over a network. In FIG. 14, a wireless LAN is used.

When the image forming apparatus 10 receives the password from the setting assistance server 30, the image forming apparatus 10 activates an access point (process 10). In this process, the image forming apparatus 10 sets the received password as a login password of the access point.

Meanwhile, when the terminal apparatus 20 receives the password from the setting assistance server 30, the terminal apparatus 20 transmits the received password to the image forming apparatus 10 as login information and starts Wi-Fi DIRECT connection (process 11).

Figure 15:
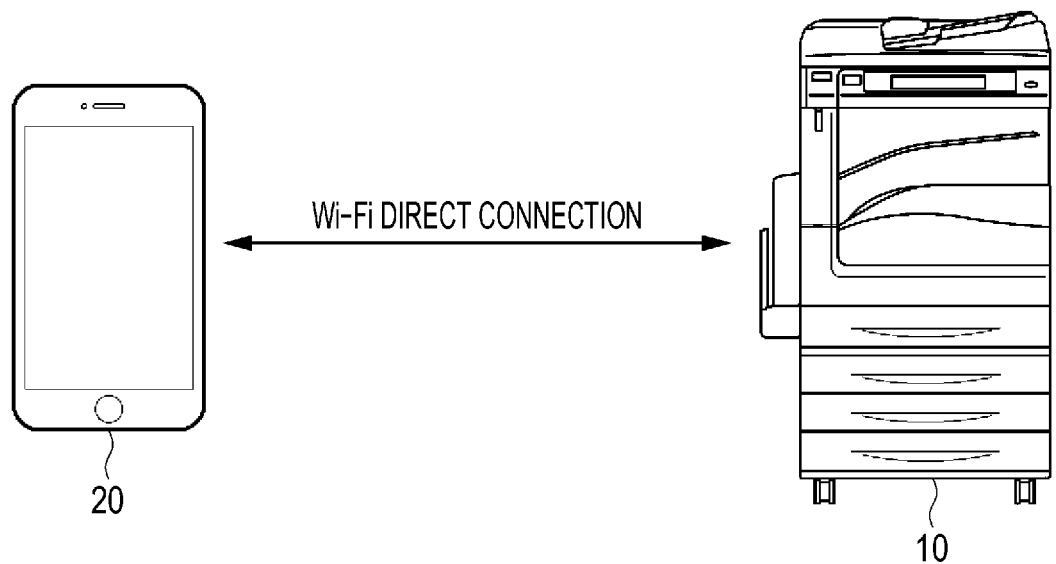
FIG. 15 is a view for explaining a communication state corresponding to process 11.

FIG. 15 is a view for explaining a communication state corresponding to process 11. The communication in this state is executed through Wi-Fi DIRECT connection. That is, the communication is direct communication between the image forming apparatus 10 and the terminal apparatus 20.

Second Exemplary Embodiment

Figure 16:
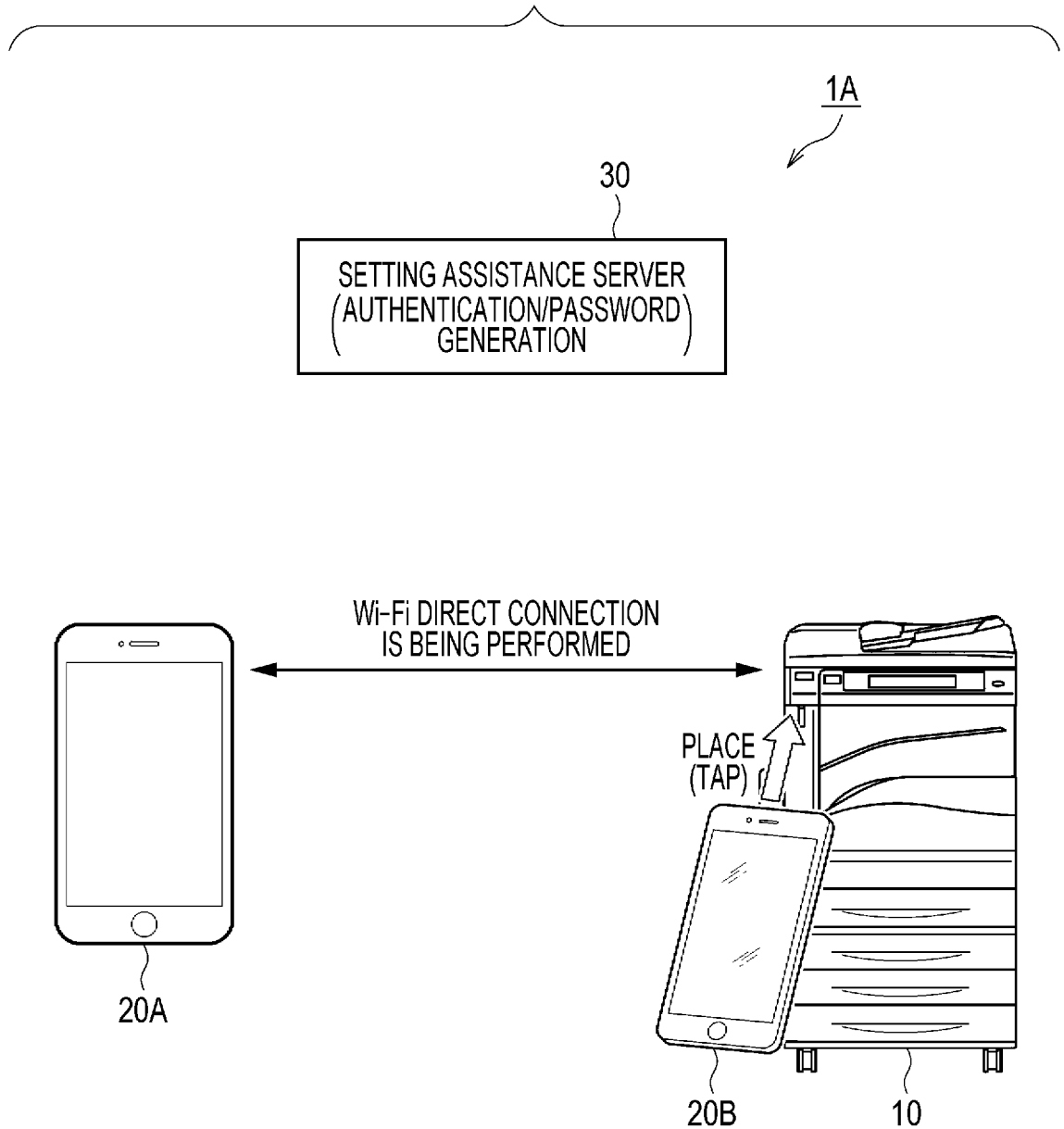
FIG. 16 is a view for explaining a conceptual configuration of an information processing system used in a second exemplary embodiment.

FIG. 16 is a view for explaining a conceptual configuration of an information processing system 1A used in a second exemplary embodiment. In FIG. 16, parts corresponding to those in FIG. 1 are given corresponding reference signs.

In the present exemplary embodiment, operation performed in a case where during Wi-Fi DIRECT connection between an image forming apparatus 10 and a terminal apparatus 20A, another terminal apparatus 20B is brought close to the image forming apparatus 10 so as to be placed over the image forming apparatus 10 is described.

Also in the information processing system 1A, a setting assistance server 30 that assists settings of Wi-Fi DIRECT communication is used.

Figure 17:
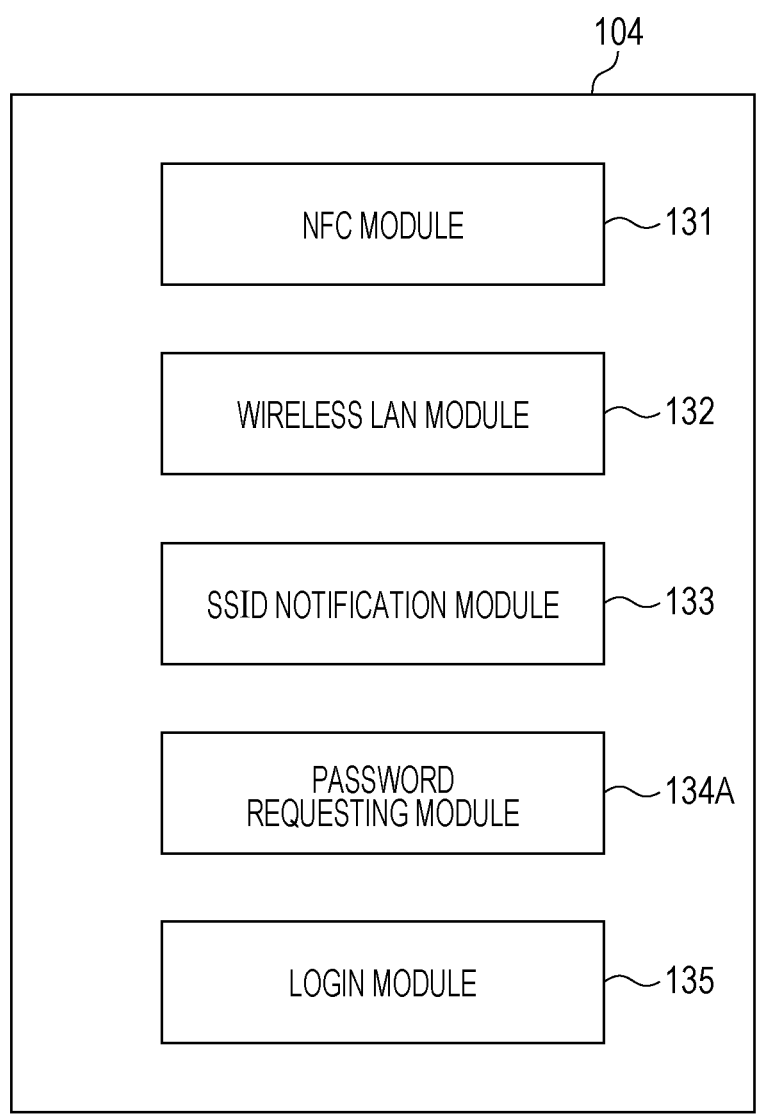
FIG. 17 is a view for explaining a functional configuration of a control unit used in the second exemplary embodiment.

FIG. 17 is a view for explaining a functional configuration of a control unit 104 used in the second exemplary embodiment. In FIG. 17, parts corresponding to those in FIG. 3 are given corresponding reference signs.

In the present exemplary embodiment, functions of a password requesting module 134A are partially different from those of the password requesting module 134 (see FIG. 3) according to the first exemplary embodiment. Specifically, the password requesting module 134A additionally has a function for handling a case where another terminal apparatus 20B is tapped during Wi-Fi DIRECT connection with the terminal apparatus 20A.

Figure 18:
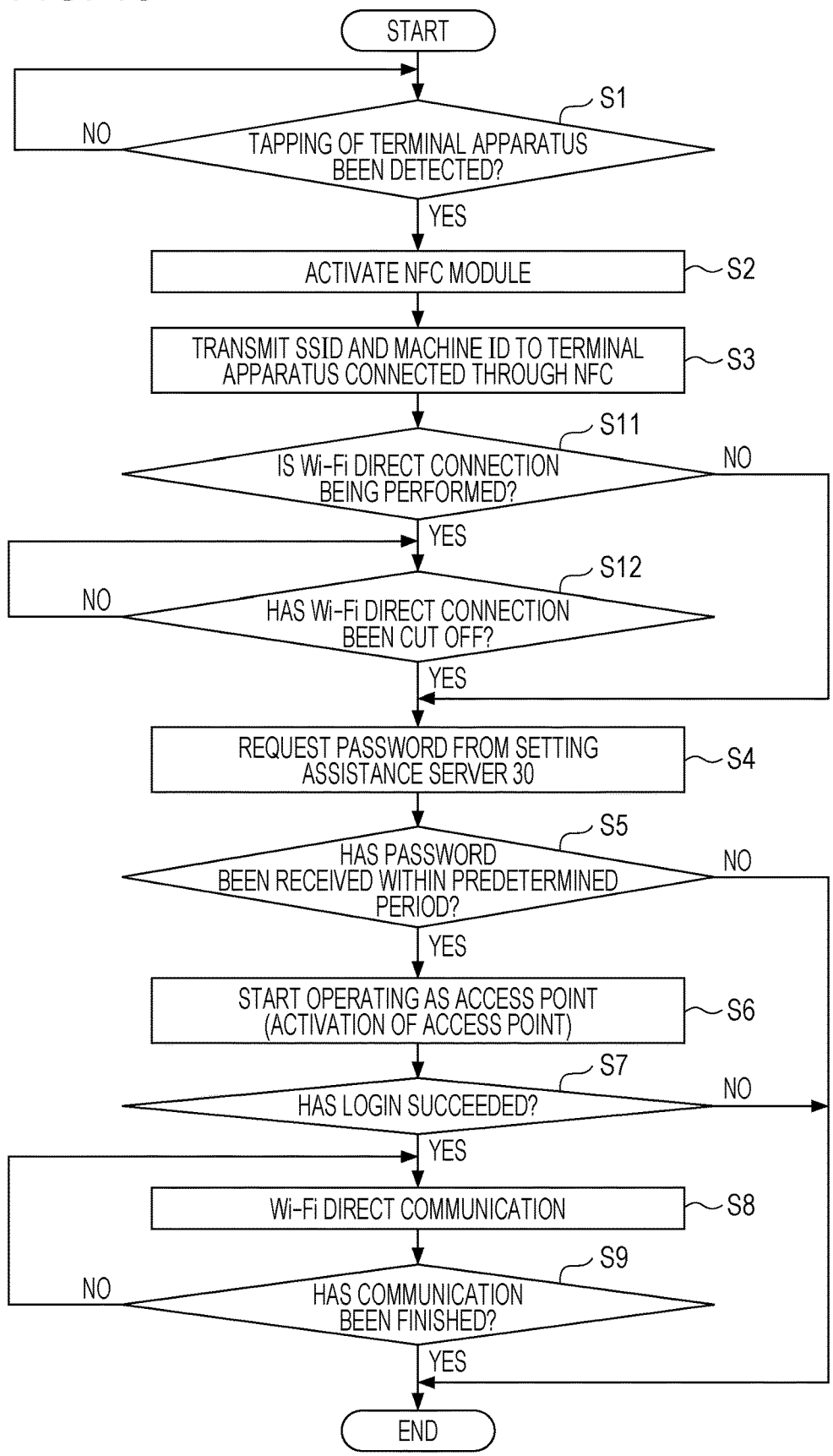
FIG. 18 is a flowchart for explaining processing operation executed by an image forming apparatus used in the second exemplary embodiment.

FIG. 18 is a flowchart for explaining processing operation executed by the image forming apparatus 10 used in the second exemplary embodiment. In FIG. 18, parts corresponding to those in FIG. 4 are given corresponding reference signs.

The processing operation illustrated in FIG. 18 is different from the processing operation illustrated in FIG. 4 in that two determining steps 11 and 12 are newly inserted between step 3 and step 4.

In the first determining step 11, it is determined whether or not Wi-Fi DIRECT connection is being executed. This determining process is executed in order to determine whether an apparatus that is tapped on the image forming apparatus 10 is the terminal apparatus 20A (see FIG. 16) or the terminal apparatus 20B (see FIG. 16).

In a case where there is no Wi-Fi DIRECT connection (in other words, in a case where the image forming apparatus 10 is not operating as an access point), a negative result is obtained in step 11. In this case, the image forming apparatus 10 shifts to the process in step 4. The operation in this case is identical to the operation in the first exemplary embodiment.

Meanwhile, in a case where Wi-Fi DIRECT connection already exists (in other words, in a case where the image forming apparatus 10 is operating as an access point), a positive result is obtained in step 11. In this case, the image forming apparatus 10 shifts to the determining step 12 in which it is determined whether or not Wi-Fi DIRECT connection has been cut off. The determining step 12 is prepared for the purpose of suspending a request for a password to the setting assistance server 30 until current connection is finished. Because of this determining process, the number of communication partners using the Wi-Fi DIRECT is always limited to 1. A negative result is obtained in step 12 while cutoff is not detected.

In a case where a positive result is obtained in step 12, the image forming apparatus 10 shifts to step 4. The subsequent processing operation is identical to that in the first exemplary embodiment.

Figure 19:
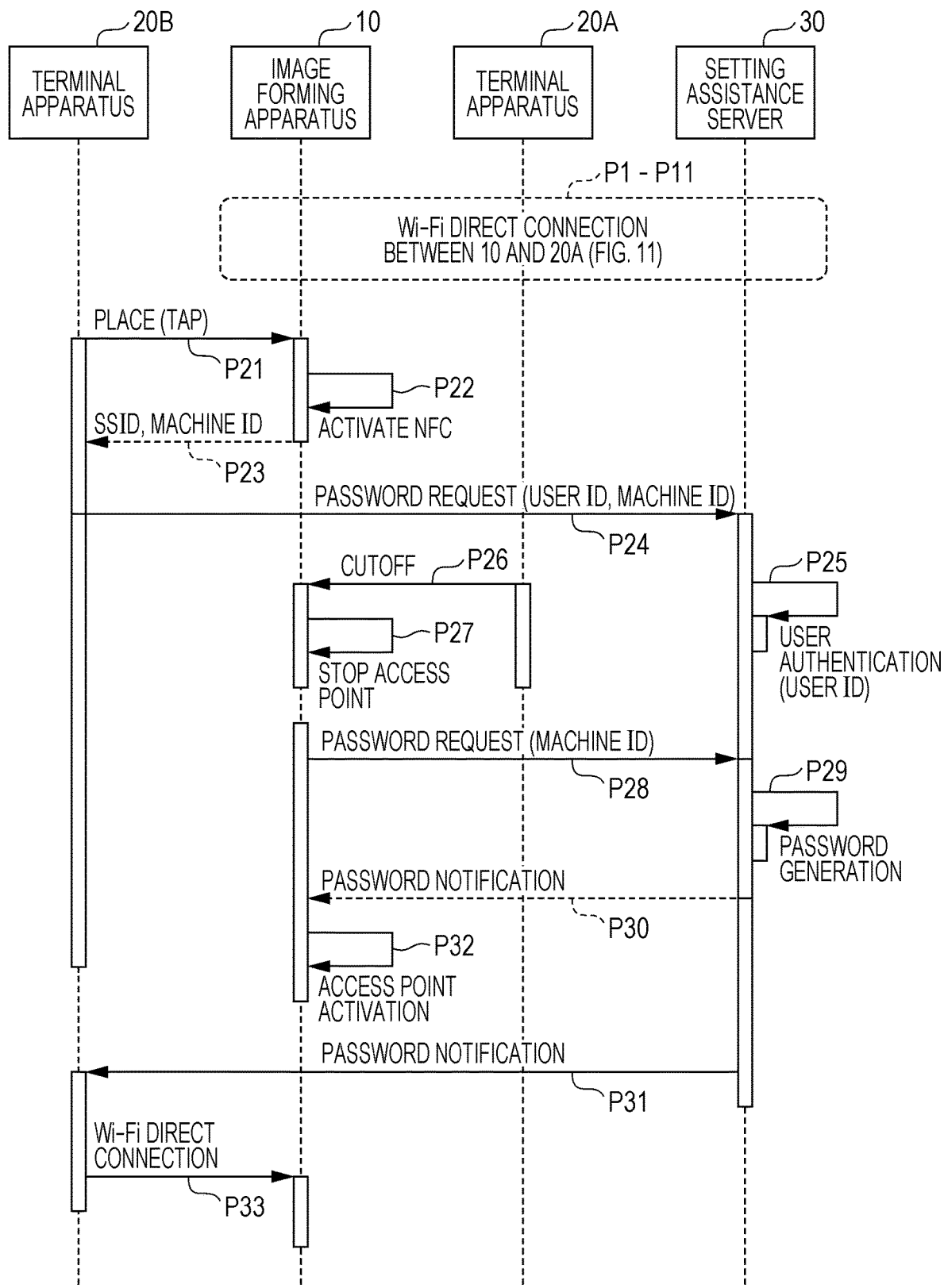
FIG. 19 illustrates an example of a processing sequence executed in the information processing system used in the second exemplary embodiment.

FIG. 19 illustrates an example of processing sequence executed in the information processing system according to the second exemplary embodiment. In FIG. 19, parts corresponding to those in FIG. 11 are given corresponding reference signs.

In FIG. 19, it is assumed that Wi-Fi DIRECT connection has already started between the image forming apparatus 10 and the terminal apparatus 20A. In FIG. 19, processes 1 through 11 are surrounded by the broken line.

In FIG. 19, the terminal apparatus 20B is placed over the image forming apparatus 10 during Wi-Fi DIRECT between the image forming apparatus 10 and the terminal apparatus 20A (process 21).

Communication using NFC can be executed in parallel with Wi-Fi DIRECT. Accordingly, the image forming apparatus 10 that has detected tapping activates NFC (process 22) and notifies the terminal apparatus 20B about an access point name (SSID) and a machine ID of the image forming apparatus 10 (process 23).

When the terminal apparatus 20B receives the machine ID and the like of the image forming apparatus 10 through NFC communication, the terminal apparatus 20B transmits a request for a password to the setting assistance server 30 (process 24). The request includes the received machine ID and a user ID of a user who operates the terminal apparatus 20B.

In the present exemplary embodiment, the setting assistance server 30 that has received the request for a password executes user authentication by using the received user ID (process 25).

Even if user authentication has succeeded, generation of a password is not started unless a request for a password is received from the image forming apparatus 10.

In the present exemplary embodiment, in a case where Wi-Fi DIRECT connection already exists, transmission of a request for a password by the image forming apparatus 10 is postponed until the image forming apparatus 10 detects cutoff of Wi-Fi DIRECT connection and stops an access point (processes 26 and 27).

That is, when it is confirmed that communication with the terminal apparatus 20A has been finished, the image forming apparatus 10 requests a password from the setting assistance server 30 (process 28).

The subsequent processing procedure is identical to that in the first exemplary embodiment.

That is, when the setting assistance server 30 receives a request for a password from the image forming apparatus 10, the setting assistance server 30 generates a password (process 29) and notifies the terminal apparatus 20B that newly requests connection with the image forming apparatus 10 about the generated password (processes 30 and 31).

The image forming apparatus 10 that receives the notification about the password activates an access point again (step 32). Furthermore, the terminal apparatus 20B executes login processing by using the notified password and starts Wi-Fi DIRECT connection with the image forming apparatus 10 (process 33).

Other Exemplary Embodiments

Although the exemplary embodiments of the present disclosure have been described above, the technical scope of the present disclosure is not limited to the scope described in the above exemplary embodiments. It is clear from the recitation of the claims that various changes or improvements of the above exemplary embodiments are also encompassed within the technical scope of the present disclosure.

Although the image reading unit 101 is provided in the image forming apparatus 10 in the above exemplary embodiments, the image forming apparatus 10 need not have the image reading unit 101.

Although a request for a password is received from the image forming apparatus 10 after user authentication of the terminal apparatus 20 in the above exemplary embodiments, the processes may be executed in a reverse order.

Although both of the process for executing user authentication and the process for generating a password are executed in the setting assistance server 30 in the above exemplary embodiments, different servers may be prepared for the respective processes. In this case, a server that generates a password need just be arranged to receive a result of user authentication.

Although a case where a position of the setting assistance server 30 on a network is known to the terminal apparatus 20 (set, for example, by an application program) has been described in the above exemplary embodiments, the terminal apparatus 20 may be notified about information on the position of the setting assistance server 30 on the network by the image forming apparatus 10 through NFC.

Although a case where a password is used as an example of security information necessary for settings of Wi-Fi DIRECT connection has been described in the above exemplary embodiments, a personal identification number (PIN) code may be used.

Although a machine ID is used as information for identifying the image forming apparatus 10 in the above exemplary embodiments, a serial number may be used or a MAC address may be used.

Although Wi-Fi is used for transmission and reception of a request for a password in the above exemplary embodiments, a wireless communication method such as Bluetooth (Registered Trademark) or ZigBee (Registered Trademark) may be used.

Although a new password is generated for each request for a password even in a case where a user does not change in the above exemplary embodiments, the same password may be generated in a case where a user is the same as before.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising a processor configured to:
   notify an information processing apparatus that is brought close to a specific portion of a body of the image forming apparatus about information for identifying the image forming apparatus and an access point name;
   request security information used for wireless connection using the image forming apparatus as an access point from a server apparatus that generates the security information on conditions that the security information has been requested by the image forming apparatus and user authentication concerning the information processing apparatus has succeeded; and
   switch to a communication mode using the image forming apparatus as an access point in a case where the security information is given by the server apparatus.

2. The image forming apparatus according to claim 1, wherein the processor is further configured to permit wireless connection with the information processing apparatus in a case where the security information given by the server apparatus and second security information given by the information processing apparatus match each other.

3. The image forming apparatus according to claim 2, wherein
   the security information changes every time the request is made.

4. The image forming apparatus according to claim 2, wherein
   in a case where another information processing apparatus is brought close to the specific portion while communication using the image forming apparatus as an access point is being performed between the image forming apparatus and the information processing apparatus, the processor suspends transmission of the request for the security information to the server apparatus until the current communication is finished.

5. The image forming apparatus according to claim 1, wherein the processor notifies the information processing apparatus about information for designating a position of the server apparatus on a network.

6. A server apparatus comprising a processor that is configured to:
   generate security information that is used for a wireless connection using an image forming apparatus as an access point on conditions that user authentication concerning an information processing apparatus has succeeded and the security information has been requested by the image forming apparatus designated by the information processing apparatus; and
   notify the image forming apparatus and the information processing apparatus about the generated security information.

7. The server apparatus according to claim 6, wherein the security information is newly generated every time a request is made.

8. The server apparatus according to claim 6, the processor is further configured to execute the user authentication by using user information received from the information processing apparatus.

9. A non-transitory computer readable medium storing a program causing a computer to execute a process, the process comprising:
   notifying an information processing apparatus that is brought close to a specific portion of a body of an image forming apparatus about information for identifying the image forming apparatus and an access point name;
   requesting security information used for wireless connection using the image forming apparatus as an access point from a server apparatus that generates the security information on conditions that the security information has been requested by the image forming apparatus and user authentication concerning the information processing apparatus has succeeded; and
   switching to a communication mode using the image forming apparatus as an access point in a case where the security information is given by the server apparatus.

10. A non-transitory computer readable medium storing a program causing a computer to execute a process, the process comprising:
    generating security information that is used for a wireless connection using an image forming apparatus as an access point on conditions that user authentication concerning an information processing apparatus has succeeded and the security information has been requested by the image forming apparatus designated by the information processing apparatus; and
    notifying the image forming apparatus and the information processing apparatus about the generated security information.

* * * * *